United States Patent [19]

Juriga et al.

[11] Patent Number: 4,491,066
[45] Date of Patent: Jan. 1, 1985

[54] TOASTER

[75] Inventors: Jan Juriga; Ingo Müller, both of Klagenfurt, Austria

[73] Assignee: U.S. Philips Corporation, New York, N.Y.

[21] Appl. No.: 571,255

[22] Filed: Jan. 16, 1984

[30] Foreign Application Priority Data

Jan. 14, 1983 [AT] Austria .................................. 124/83

[51] Int. Cl.³ ............................................. A47J 37/08
[52] U.S. Cl. ....................................... 99/391; 99/401
[58] Field of Search ................. 99/401, 385, 389, 391, 99/393, 329 R

[56] References Cited

U.S. PATENT DOCUMENTS

| 1,480,084 | 1/1924 | Lamb | 99/391 |
| 1,963,409 | 6/1934 | Johnson | 99/391 |
| 2,739,525 | 3/1956 | Giambertoni | 99/401 X |
| 3,358,584 | 12/1967 | Sutton et al. | 99/329 R |
| 3,986,444 | 10/1976 | Caudron | 99/391 |

FOREIGN PATENT DOCUMENTS 2748549 7/1979 Fed. Rep. of Germany ........ 99/391

Primary Examiner—Billy J. Wilhite
Attorney, Agent, or Firm—Rolf E. Schneider

[57] ABSTRACT

A toaster, which for lowering a slice (6) of bread into a toasting position comprises a slice support (5) which is movable beneath a slot (4) and for retaining a slice in the toasting position comprises two retaining grids (13, 14) arranged each on one side of the path of movement of the slice support, also comprises spring means for pivoting said grids away from the path of movement or towards the path of movement of the slice support depending on the position of said support, which spring means comprise first spring portions (23, 24) which act on the retaining grids, central second spring portions (25, 26) coupled to the toaster, and third spring portions (27, 28) which extend in the path of movement of the slice support to cooperate with said support. The spring means comprise two separate springs (21, 22) each associated with one of the retaining grids, whose third spring portions cross each other in the path of movement of the slice support and having free ends which act against the toaster under spring bias.

2 Claims, 4 Drawing Figures

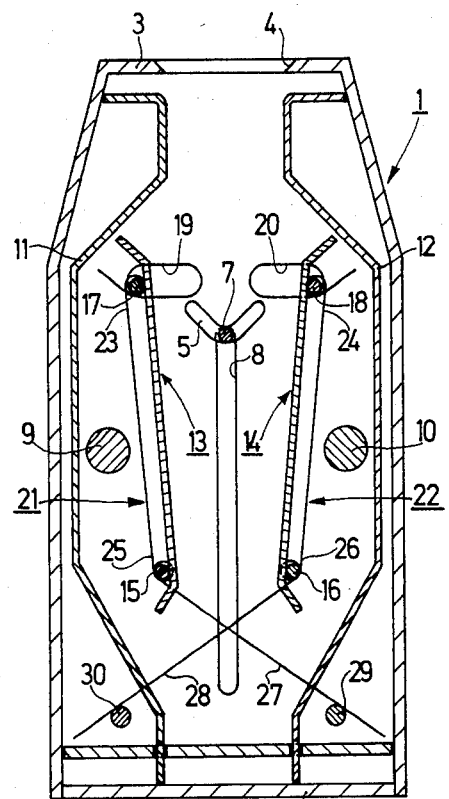
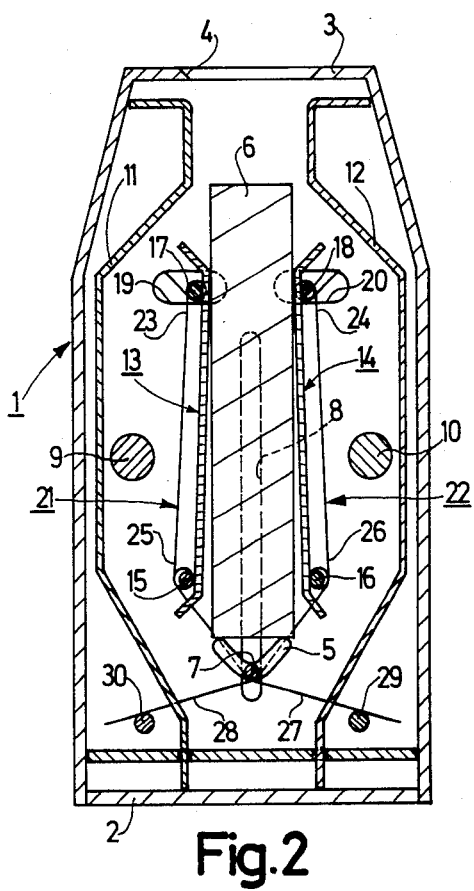
Fig.1
Fig.2

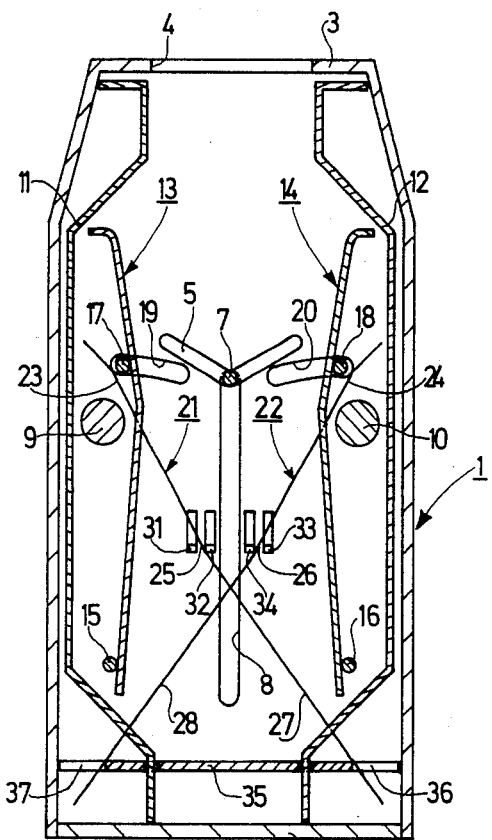
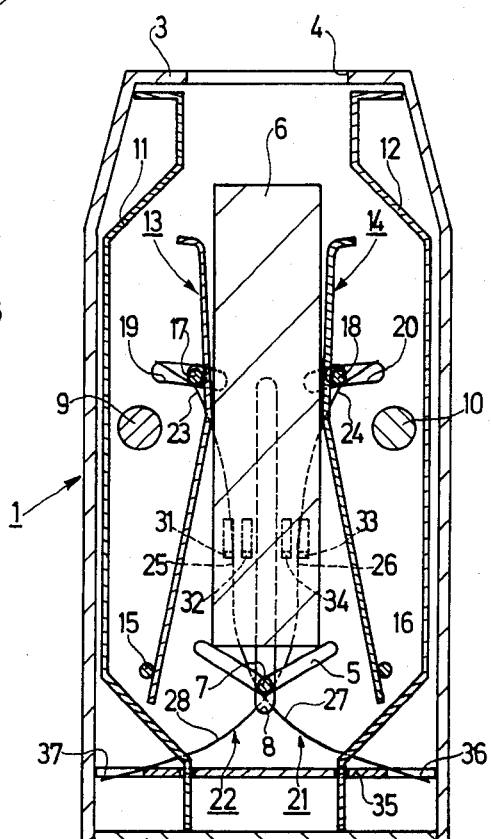

TOASTER

The invention relates to a toaster, which comprises a slice support which is movably arranged beneath an insertion slot for lowering a slice of bread into a toasting position, and two retaining grids for keeping a slice in the toasting position, which grids are each arranged on one side of the path of movement of the slice support, are each pivotable about a pivoting spindle near the end of the path of movement of the lowered slice support, and cooperate with spring means comprising first spring portions which act on the retaining grids at locations which are remote from the pivoting spindles, central second spring portions coupled to the appliance, and third spring portions which extend in the path of movement of the slice support, the spring means cooperating with the slice support to move the retaining grids towards the path of movement of the slice support when said support is lowered and in the opposite direction when said support is lifted.

Such a toaster is shown in FIGS. 5 and 6 of British Pat. No. 1,552,878. In this known toaster the spring means comprises a single spring whose overall shape resembles that of a U, the connecting portion between the two limbs of the U-shaped spring, which connecting portion constitutes the third spring portion of the spring means and extends in the path of movement of the slice support, being S-shaped. At each transition between a limb and the connecting portion the U-shaped spring is formed with a spring turn with which it is slid onto the two pivoting spindles of the retaining grids, so that the spring means is coupled to the appliance with these spring turns which form the central second spring portions of the spring means. The free ends of the two limbs of the U-shaped spring, which ends form the first spring portions of the spring means, are each formed with a loop with which they are each slid onto a connecting member of a retaining grid which is remote from the pivoting spindle, where they act on the retaining grids. In order to obtain such a one-piece spring means of this shape several bending operations are necessary, namely forming the S-shaped connecting portion, forming the two U-shaped limbs, and forming the spring turns and the loops. The manufacture of such a spring with the desired spring characteristics is intricate and expensive, and, in addition, a comparatively high accuracy is required in order to guarantee a correct mounting of the spring.

It is the object of the invention to mitigate the aforementioned problems and to provide a toaster of the type specified in the opening paragraph with a spring means whose manufacture is simple non-critical and so that a simple assembly of the appliance is guaranteed, which is particularly important in the case of production in large quantities. According to the invention the spring means comprises two separate springs which are each associated with one retaining grid, whose third spring portions cross one another in the path of movement of the slice support, and having free ends which act against the appliance under spring bias. Thus, each of the two springs has a simple shape, can therefore be manufactured simply and can also be mounted in the appliance in a simple manner.

It is found to be particularly advantageous if the springs comprise substantially straight springs and are coupled to the appliance in a central part of the path of movement of the slice support by guide means in which the springs are axially movable. Thus, in order to obtain the desired spring characteristics the springs need not be subjected to special bending operations, so that manufacturing and mounting of said springs are very simple.

Two embodiments of the invention will now be described in more detail, by way of example, with reference to the drawings.

FIG. 1 is a cross-sectional view of a toaster which does not contain a slice and which comprises spring means in the form of two lever springs.

FIG. 2 shows the toaster of FIG. 1 containing a slice of bread in the toasting position.

FIG. 3 is a sectional view of a toaster which does not contain a slice of bread and which comprises spring means in the form of two essentially straight springs.

FIG. 4 shows the toaster of FIG. 3 containing a slice in the toasting position.

The toaster shown in FIGS. 1 and 2 comprises a substantially prismatic housing 1, whose upper surface 3 which faces the bottom surface 2 is formed with a slot 4 for inserting a slice of bread. If the slot 4 is sufficiently long it is possible to insert two slices at the same time. Beneath the slot 4 a movable V-shaped slice support 5 is arranged to lower a slice 6 present in the slot into a toasting position as shown in FIG. 2. The path of movement of the slice support 5 may be defined for example by guiding this support with laterally projecting pins 7 which cooperate with lateral slots 8 in the appliance, the slice support being manually lowered and being retained in the lowered position by a latching device, not shown, until the desired degree of browning of the slice is attained, after which the support is automatically released by the latching device and under the influence of a spring, not shown, is returned to its initial position in which the slice projects from the slot 4. Near the toasting position heating elements are arranged on both sides of the slice 6, which elements in the present example are constructed as tubular heating elements 9 and 10 which cooperate with reflectors 11 and 12. It is obvious that flat heating elements may be employed instead of tubular heating elements.

In order to retain a slice in the toasting position, retaining grids 13 and 14 are each arranged on one side of the path of movement of the slice support 5, so as to be pivotable about pivoting spindles 15 and 16, respectively, near the end of the path of movement of the lowered slice support 5. In the present case these pivoting spindles 15 and 16 are formed by the free end-portions of connecting members of the retaining grids 13 and 14, respectively, which free end portions engage lateral openings in the appliance. Further connecting members 17 and 18 near these sides of the retaining grids 13 and 14, respectively, which are remote from the pivoting spindles 15 and 16 respectively comprise free end portions which engage lateral slots 19 and 20 in the appliance, thereby defining the paths along which the retaining grids can be pivoted.

Depending on whether the slice support 5 is in the raised or the lowered position, the retaining grids 13 and 14 can be moved away from or towards the path of movement of this spport, which is effected by spring means which are arranged on each side of the slice support 5 and which comprise spring portions which extend in the path of movement of the slice support. The spring means comprise two separate springs 21 and 22 each associated with one of the two grids 13 and 14 respectively. Each of these springs 21 and 22 comprises three functional spring portions. The first spring portions 23 and 24 act on the grids at locations which are remote from the pivoting spindles 15 and 16 respectively of the grids 13 and 14, for which in the present case their free end portions are formed into loops which are fitted around the free end portions of the connecting members 17 and 18 of the grids. The central second spring portions 25 and 26 of the two springs 21 and 22 serve for coupling the springs to the appliance, for which purpose they are each provided with at least one spring turn with which they are fitted around the pivoting spindles 15 and 16 respectively formed by the free end portions of the relevant connecting members of the two grids. The third spring portions 27 and 28 of the two springs 21 and 22 respectively are inclined relative to the first spring portions 23 and 24 respectively towards the path of movement of the slice support 5, so that these two third spring portions 27 and 28 cross each other in the path of movement of the slice support 5, acting against the appliance, in the present case against pins 29 and 30 provided on the appliance, under spring bias at the location of their free ends. In the present case the first spring portions 23, 24 and the third spring portions 27, 28 of the springs 21 and 22 function as lever springs.

As can be seen in FIG. 1, the spring bias of the springs 21 and 22 ensures that when the slice support 5 is in the raised position those sides of the grids 13 and 14 which are remote from the pivoting spindles 15 and 16, respectively are urged away from the path of movement of the slice support until the free end portions of the connecting members 17 and 18 of the grids abut with the corresponding ends of the slots 19 and 20 in the appliance. Now it is possible to insert a slice. If after insertion of a slice 6 into the slot 4 the slice support 5 is lowered, the slice is freely movable between the grids 13 and 14 which have been pivoted out of the path of movement of the slice support 5. As the slice support 5 is lowered it contacts the two crossing third spring portions 27 and 28 of the springs 21 and 22 and as the slice support 5 is lowered further these two third spring portions 27 and 28 are bent towards the path of movement of the slice support 5, until the slice support 5 is latched in the toasting position for the slice 6. However, as a result of this bending of the two third spring portions 27 and 28 the two first spring portions 23 and 24 of the springs 21 and 22 are moved towards the path of movement of the slice support 5, the direction of the forces which they exert being reversed, so that the slice 6 is retained between the two retaining grids 13 and 14, as is shown in FIG. 2. After toasting of the slice when the slice support 5 is released by the latching device and is subsequently lifted under the influence of the springs acting on it, the two third spring portions 27 and 28 gradually straighten, so that the springs 21 and 22 are relaxed and their first portions 23 and 24 are again pivoted away from the path of movement of the slice support 5. The grids 13 and 14 are then also pivoted away from the slice 6 and the path of movement of the slice support 5, so that the slice is no longer retained and can be slid out of the slot 4 by the slice support, without being impeded by the retaining grids.

As can be seen, the construction and consequently the manufacture of the spring means, which position the retaining grids depending on the movement of the slice support, as two separate springs each associated with one of the grids are simple and cheap. Moreover, mounting two such springs is also very simple.

In the embodiment shown in FIGS. 3 and 4 the construction, the arrangement and the operation of the slice support 5 and the grids 13 and 14 are in principle the same as in the embodiment described in the foregoing. The two springs 21 and 22 of the spring means which are each associated with one of the grids 13 and 14, are now essentially straight in the non-loaded condition, so that their construction and manufacture are very simple. Again the springs 21 and 22 comprise three functional spring portions. The first spring portions 23 and 24, again act on those sides of the grids 13 and 14 which are remote from the pivoting spindles 15 and 16, for which purpose their free end portions are again formed into loops with which they are fitted around the free end portions of the connecting members 17 and 18 of the grids. The central second spring portions 25 and 26 again serve for coupling the springs to the appliance, but in the present embodiment this coupling has the form of axial guides for the springs in the central part of the path of movement of the slice support 5. In the present example these guides simply comprise two spaced adjacent projections 31, 32 and 33, 34 respectively, between which the springs extend and which thus constitute axial guide means for the springs. These projections may for example be bent out of a lateral sheet portion of the appliance which is formed with the slots 19 and 20, which guide the grids during their pivotal movements. However, various alternative constructions for such guide means are possible. For example, instead of projections there may be provided separate pins or the guide means may be formed by pivotable studs with transverse holes through which the springs extend and in which they are axially movable. The third portions 27 and 28, which in the present case form an essentially straight prolongation of the first and the second spring portions 23, 25 and 24, 26 respectively, again cross each other in the path of movement of the slice support 5 and act on the appliance with their free ends under spring bias. For this purpose the free ends of the third spring portions simply extend through corresponding slots 36 and 37 formed in a partition 35 and abut with one of the ends of the slots. As can be seen, as a result of the construction and the location of their guide means in the central part of the path of movement of the slice support 5, their force-sustained abutment with the retaining grids and their coupling to the appliance, the springs 21 and 22 act as springs which are in principle straight and which are only bent in the condition in which they are loaded by the slice support 5.

When the slice support 5 is in its lifted position as shown in FIG. 3, the spring bias of the springs 21 and 22 ensures that the grids 13 and 14 are pivoted away from the path of movement of the slice support with their sides which are remote from the pivoting spindles 15 and 16 respectively. The central second spring portions 25 an 26 of the springs 21 and 22 then cooperate with the projections 32 and 34 which are situated nearer the path of movement of the slice support 5. When the slice support 5 is lowered it again comes into contact with the crossing third spring portions 27 and 28 of the springs 21 and 22, these spring portions being bent towards the path of movement of the slice support as this support is lowered further until it is latched in the toasting position for a slice of bread. As the third spring portions 27 and 28 are thus bent, the direction of the force exerted on the grids 13 and 14 by the first spring portions 23 and 24 is reversed, so that these grids are pivoted towards the path of movement of the slice support 5 until they come into contact with the slice 6 on the slice support. As the slice support 5 is lowered further until it is latched in the toasting position for the slice, during which the third spring portions 27 and 28 are bent further, the central second spring portions 25 and 26 no longer cooperate with the projections 32 and 34 but with the projections 31 and 33, respectively, after which the first spring portions 23 and 24 are bent away from the path of movement of the slice support 5, so that the forces exerted on the grids 13 and 14 increase further and the slice is retained between these grids. In this situation the springs 21 and 22, viewed over their three spring portions, have an S-shaped curvature, as can be seen in FIG. 4. The degree of this S-shaped curvature depends on the thickness of the slice of bread between the grids 13 and 14. When the slice support 5 is lifted the sequence of operations is reversed, the grids 13 and 14 releasing the slice 6 and being pivoted away from the path of movement of the slice support 5 until they have reached the positions defined by the slots 19 and 20 as the third spring portions 27 and 28 are no longer bent and the springs 21 and 22 straighten.

Thus, by constructing the springs as basically straight springs they can be manufactured in a very simple manner, because, apart from the loops which serve for co-operation with the connecting members of the grids, the springs need not be subjected to further bending operations, whilst moveover it is to be noted that the manufacture of such loops is entirely non-critical. However, mounting these springs is also very simple and non-critical as regards tolerances, because they merely have to be inserted between the projections by means of which they are retained and axially guided and have to be inserted into the slots constituting the abutments on the appliance, the loops being fitted onto the free ends of the connecting members of the retaining grids. Such spring means provide a very satisfactory spring action, so that the slices of bread are firmly retained in the toasting position by the retaining grids.

It is to be noted that the two springs 21 and 22 need not be provided with loops, for example, if their first spring portions 23 and 24, which must act on the grids 13 and 14, extend through lugs formed on the connecting members 17 and 18 of the retaining grids and the free ends on their third spring portions 27 and 28 also act on the appliance in the axial direction of the springs.

As will be apparent from the foregoing, several modifications to the embodiments described are possible within the scope of the invention. This is for example possible with respect to the shape of the springs forming the spring means and the manner in which they are coupled to the appliance and act on the appliance and on the retaining grids, which parameters may be varied so as to obtain the desired forces and movements of the grids. If desired, there may be provided two such spring means, one on each of the two sides of the slice support.

What is claimed is:

1. A toaster, which comprises a slice support movably arranged beneath an insertion slot for lowering a slice of bread into a toasting position; two retaining grids for keeping a slice in the toasting position, said grids being respectively arranged on the sides of the path of movement of the slice support and being each pivotable about a pivoting spindle near the end of the path of movement of the lowered slice support; and two seperate springs respectively having first spring portions acting on the retaining grids at locations remote from the pivoting spindles, central second spring portions coupled to the toaster, and third spring portions extending in the path of movement of the slice support; said two springs cooperating with the slice support to move the retaining grids towards the path of movement of the slice support when said support is lowered and in the opposite direction when said support is lifted, the third spring portions crossing one another in the path of movement of the slice support and having free ends acting against the toaster under spring bias.

2. A toaster as claimed in claim 1, in which the springs are substantially straight and are coupled to the toaster in a central part of the path of movement of the slice support by guide means in which the springs are axially movable.

* * * * *